(12) United States Patent
Lotz

(10) Patent No.: US 10,166,672 B1
(45) Date of Patent: Jan. 1, 2019

(54) MAGNETIC ROBOT CRAWLER

(71) Applicant: Deep Trekker Inc., Kitchener (CA)

(72) Inventor: Jeffrey Lotz, Ayr (CA)

(73) Assignee: DEEP TREKKER INC., Kitchener, Ontario (CA)

( * ) Notice: Subject to any disclaimer, the term of this patent is extended or adjusted under 35 U.S.C. 154(b) by 77 days.

(21) Appl. No.: 15/629,482

(22) Filed: Jun. 21, 2017

(51) Int. Cl.
| | |
|---|---|
| *B25J 5/00* | (2006.01) |
| *B60B 19/00* | (2006.01) |
| *B63B 59/10* | (2006.01) |
| *B25J 19/00* | (2006.01) |
| *B25J 19/02* | (2006.01) |
| *B60L 11/18* | (2006.01) |
| *B62D 57/024* | (2006.01) |
| *H04N 5/225* | (2006.01) |

(52) U.S. Cl.
CPC ............. *B25J 5/007* (2013.01); *B25J 19/005* (2013.01); *B25J 19/023* (2013.01); *B60B 19/006* (2013.01); *B60L 11/1879* (2013.01); *B62D 57/024* (2013.01); *B63B 59/10* (2013.01); *B60L 2230/12* (2013.01); *H04N 5/2257* (2013.01)

(58) Field of Classification Search
CPC .......... B25J 5/007; B63B 59/10; B63B 59/08; B62D 57/024; B60B 19/006; B60B 2900/931; B60B 15/00
USPC .......................................... 114/222
See application file for complete search history.

(56) References Cited

U.S. PATENT DOCUMENTS

| | | | | | |
|---|---|---|---|---|---|
| 5,284,096 | A | * | 2/1994 | Pelrine | B62D 49/04 |
| | | | | | 104/138.2 |
| 5,435,405 | A | * | 7/1995 | Schempf | B08B 9/08 |
| | | | | | 180/9.1 |
| 6,000,484 | A | * | 12/1999 | Zoretich | B05B 13/005 |
| | | | | | 180/21 |

(Continued)

FOREIGN PATENT DOCUMENTS

| | | | | | |
|---|---|---|---|---|---|
| WO | WO-9724251 A1 | * | 7/1997 | ........... | B62D 55/265 |
| WO | WO-2004074011 A1 | * | 9/2004 | ............. | B60B 3/048 |

OTHER PUBLICATIONS

Syvo, M2 Handy, VertiDrive M3 robots VertiDrive (http://vertidrive.nl/robots/handy/).

(Continued)

*Primary Examiner* — Ruth Ilan

(57) ABSTRACT

A magnetic robot crawler designed to efficiently adhere and traverse a ferrous surface partially or fully underwater, regardless of orientation. The crawler includes a vehicle body, a plurality of drive wheel assemblies, and a plurality of gearmotors. The vehicle body houses the necessary electronical components. The drive wheel assemblies are peripherally and externally mounted to the vehicle body in order to support the vehicle body. Each of the drive wheel assemblies is torsionally coupled to a corresponding gearmotor. Each of the drive wheel assemblies includes a tubular housing, a wheel, an annular cavity, and a semi-annular magnet. The wheel is rotatably mounted to the vehicle body through a tubular housing and is torsionally coupled to the corresponding gearmotor through a magnetic coupling. The annular cavity laterally traverses into the wheel and receives the semi-annular magnet. The semi-annular magnet stays stationary while the wheel turns about the semi-annular magnet.

13 Claims, 6 Drawing Sheets

(56) References Cited

U.S. PATENT DOCUMENTS

| | | | | |
|---|---|---|---|---|
| 6,125,955 | A * | 10/2000 | Zoretich | B60B 19/006 152/44 |
| 8,342,281 | B2 * | 1/2013 | Rooney, III | B63B 59/10 180/164 |
| 9,586,636 | B1 * | 3/2017 | Burmeister | B62D 57/024 |
| 2007/0276552 | A1 * | 11/2007 | Rodocker | B62D 57/00 701/2 |
| 2009/0078484 | A1 * | 3/2009 | Kocijan | B60L 13/04 180/167 |
| 2009/0166102 | A1 * | 7/2009 | Waibel | B08B 1/008 180/7.1 |
| 2010/0212983 | A1 * | 8/2010 | Lama | B62D 57/024 180/167 |
| 2010/0307545 | A1 * | 12/2010 | Osaka | B08B 3/024 134/198 |
| 2014/0116316 | A1 * | 5/2014 | Fontaine | B63B 59/10 114/222 |
| 2014/0230711 | A1 * | 8/2014 | Lovelace | B63B 59/08 114/222 |
| 2016/0325794 | A1 * | 11/2016 | Baur | B62D 57/024 |

OTHER PUBLICATIONS

Syvo, M3 Dryblasting, VertiDrive M3 robots VertiDrive (http://vertidrive.nl/vertidrive-m3-robots).
Syvo, M3 Washing, VertiDrive M3 robots VertiDrive (http://vertidrive.nl/vertidrive-m3-robots).
Syvo, M4.1, VertiDrive M3 robots VertiDrive (http://vertidrive.nl/vertidrive-m4-robots).

* cited by examiner

MAGNETIC ROBOT CRAWLER

FIELD OF THE INVENTION

The present invention relates generally to robotic devices used to clean or inspect a hull of a vessel, a pipe, or other similar objects. More specifically, the present invention is a robotic vehicle which utilizes strong magnets integrated within the wheels in order to adhere to a ferrous surface.

BACKGROUND OF THE INVENTION

Vessels and other underwater/semi-underwater structures are constantly exposed to a variety of environmental factors, salt water in particular. As a result, these types of structures require regular maintenance such as inspections, cleaning, and repairs. Adequate maintenance of such structures is difficult to implement because the majority of said structures are partially or fully submerged underwater. Additionally, when performed by hand, the costs and time required for maintenance increase drastically. One of the main solutions for this problem is the use of robotic vehicles capable of adhering to a ferrous surface. Traditional designs for these types of robotic vehicles include the use of strong magnets in order to adhere the body of the robotic vehicle to a ferrous surface. Currently, there are two main means for mounted magnets within a robotic vehicle. The first method includes mounting magnets on the belly of the robotic vehicle. While this is effective, the design requires the bottom surface of the robotic vehicle to run close to the steel surface. This causes hang ups in areas where the surface is not smooth. The second method includes mounting magnets along the entire wheel or track set. This method is rather expensive, heavy, and hard to clean.

The present invention is an alternative solution for adhering a robotic vehicle to a ferrous surface. The present invention mounts a relatively large magnet into each of the wheels, adjacent to a bottom portion of the wheel. The magnet is held in this orientation while the wheel moves around the magnet, thus protecting the magnet from the external environment. Positioning a single large magnet within each wheel improves maneuverability and decreases maintenance costs and weight for the robotic vehicle.

DETAIL DESCRIPTIONS OF THE INVENTION

Figure 1:
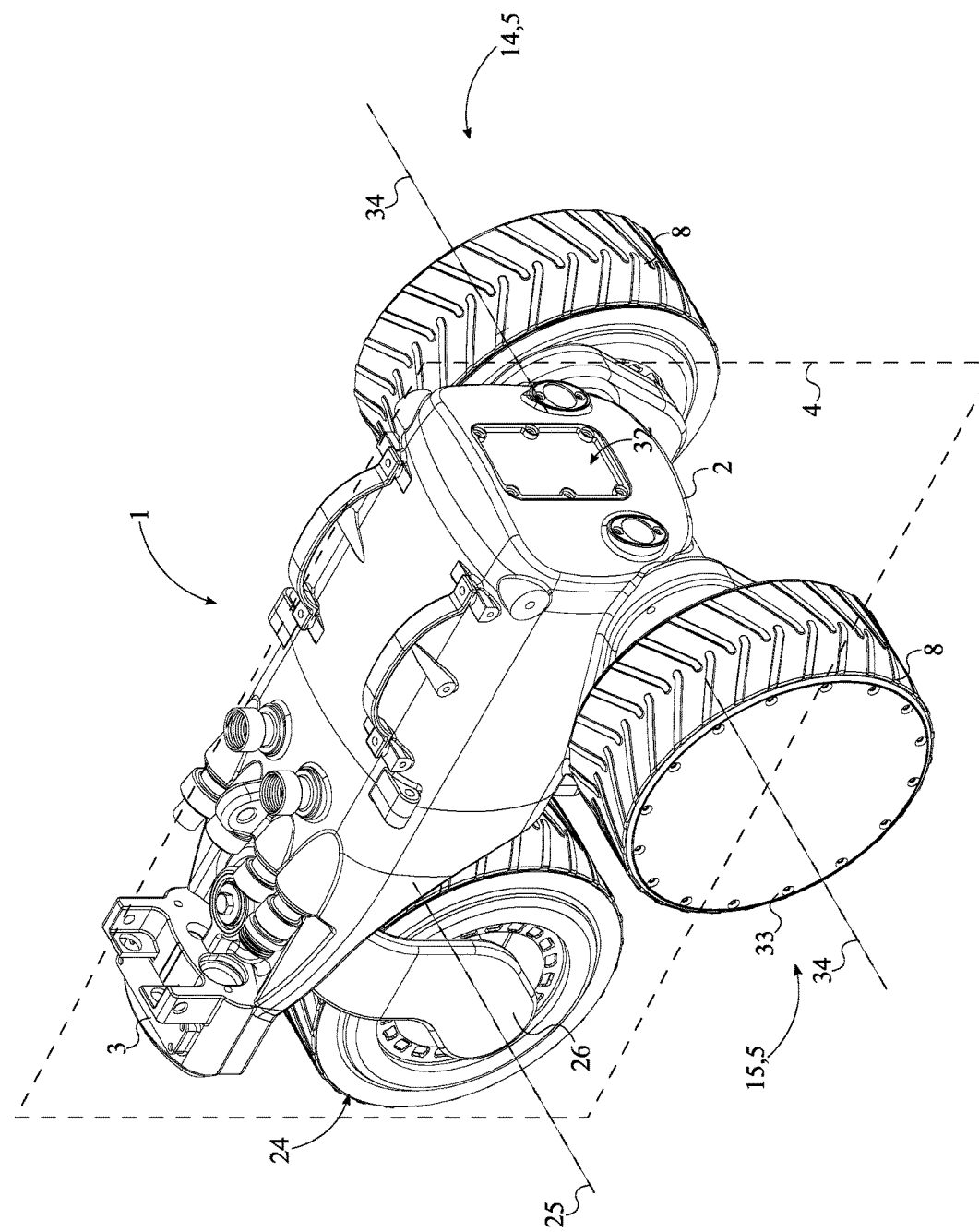
FIG. 1 is a perspective view of the present invention.

All illustrations of the drawings are for the purpose of describing selected versions of the present invention and are not intended to limit the scope of the present invention.

The present invention generally relates to robotic vehicles. More specifically, the present invention is an alternative design for a robotic vehicle used for maintenance of vessels, pipes, boats, and other similar ferrous structures. The present invention mounts a strong magnet within the wheels of the robotic vehicle in order to adequately adhere the robotic vehicle to a ferrous surface. This design ensures that the magnet is as close to the ferrous surface as possible without exposing the magnet to external environmental factors, salt water for example.

The present invention is a robotic vehicle utilized to traverse a ferrous surface. In the simplest embodiment, referring to FIG. 1 and FIG. 2, the present invention comprises a vehicle body 1, a plurality of drive wheel assemblies 5, and a plurality of gearmotors 19. The vehicle body 1 houses and protects the electrical and mechanical components necessary for the function of the present invention. Thus, the vehicle body 1 may be implemented in a variety shapes and sizes based on the needs and preferences associated with different applications. Additionally, the vehicle body 1 comprise a front portion 2 and a rear portion 3. The front portion 2 and the rear portion 3 easily detach in order to provide a means for mounting components within the vehicle body 1 as well as for maintenance purposes. Each the plurality of gearmotors 19 converts electrical energy into rotational mechanical energy. In general, the plurality of gearmotors 19 powers the plurality of drive wheel assemblies 5 in order to translate the vehicle body 1 along the ferrous surface. The plurality of gearmotors 19 is mounted within the vehicle body 1, protected from external elemental factors.

Figure 4:
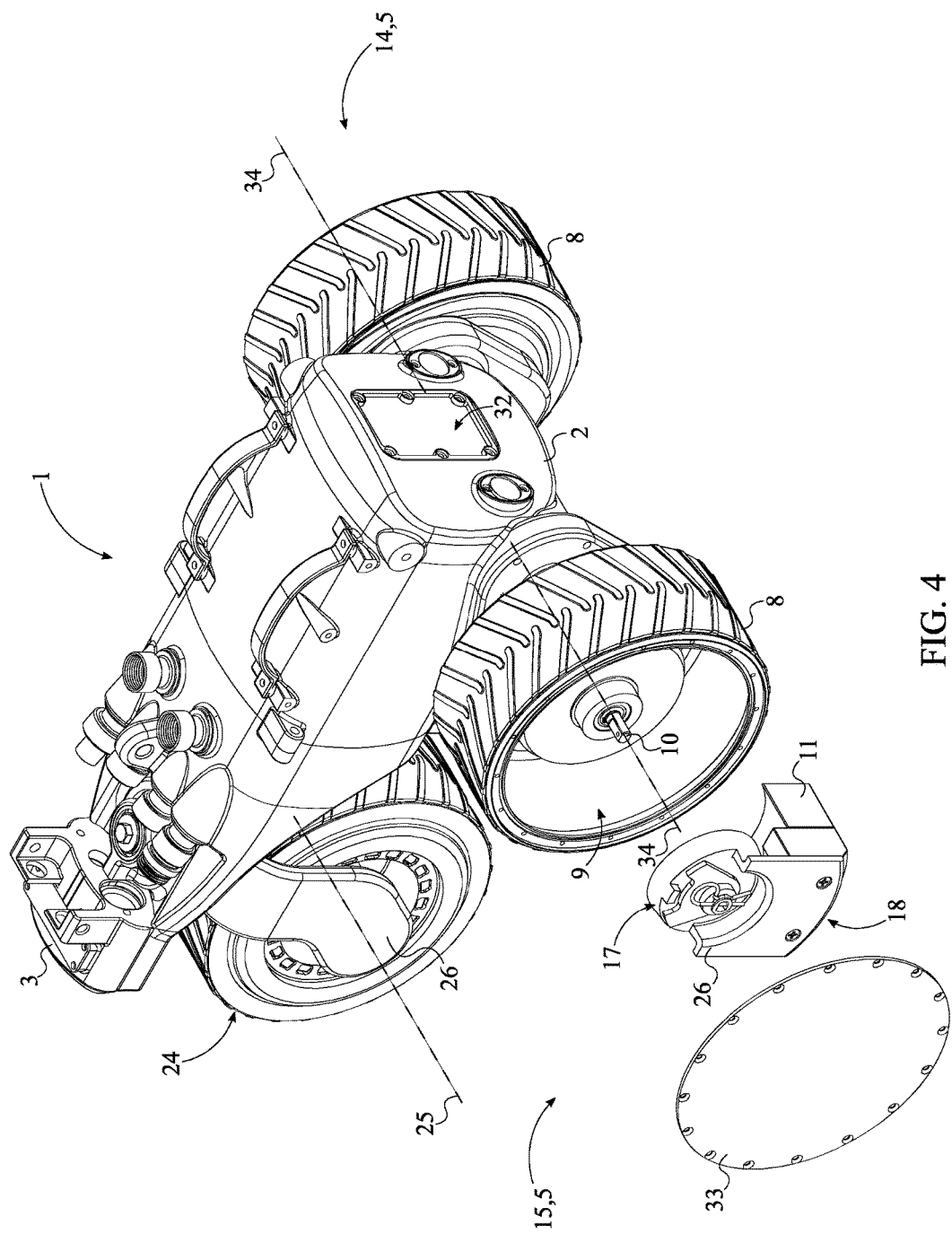
FIG. 4 is a perspective view of the present invention with the second wheel assembly in a partially exploded configuration.
Figure 5:
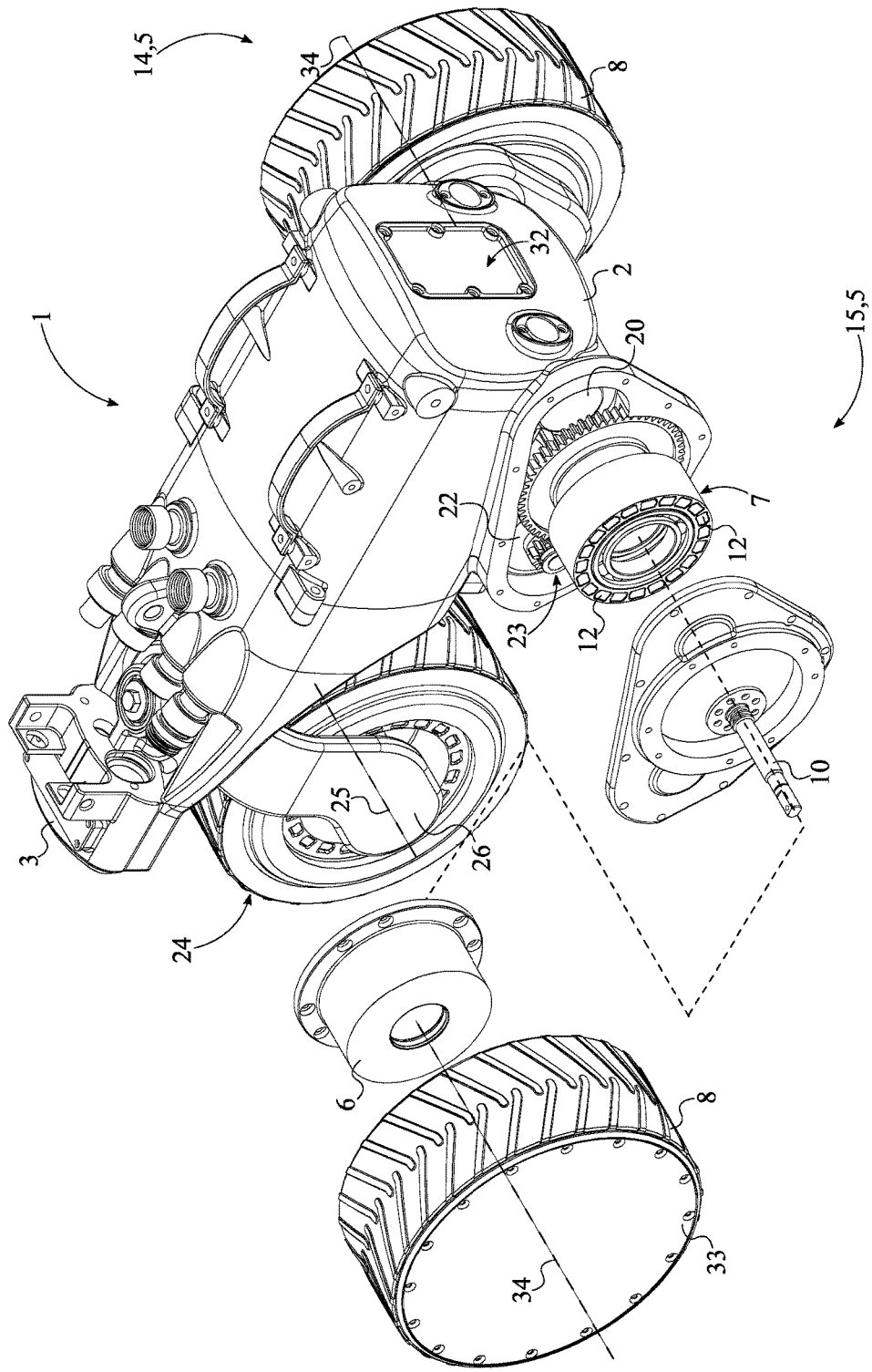
FIG. 5 is a perspective view of the present invention with the second wheel assembly in an alternative partially exploded configuration.
Figure 6:
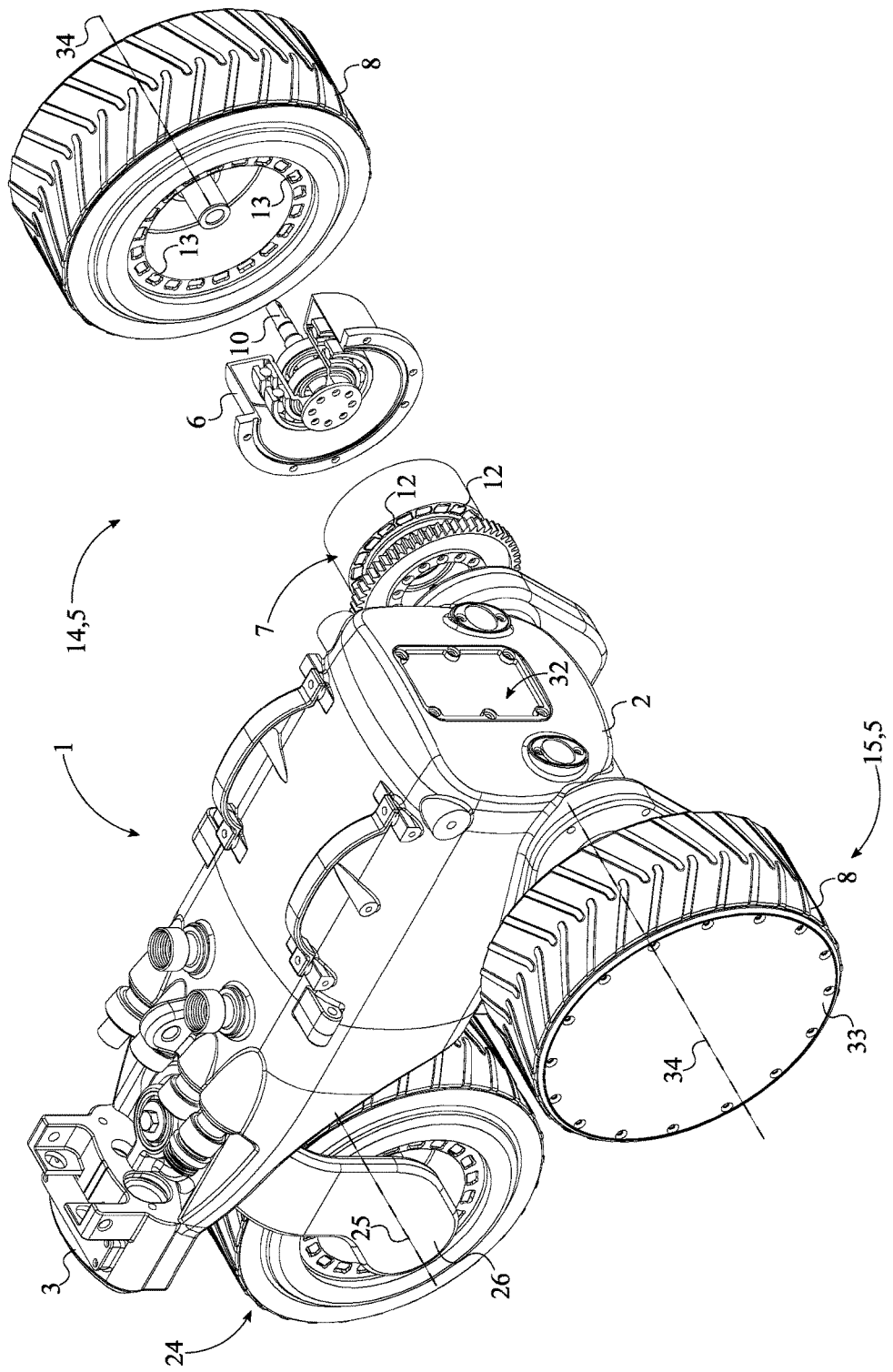
FIG. 6 is a perspective view of the present invention with the first wheel assembly in an partially exploded and a partially internal configuration.

Each of the plurality of drive wheel assemblies 5 support the vehicle body 1 and subsequently adhere the vehicle body 1 to a ferrous surface, regardless of the orientation of the ferrous surface. One of the main purposes of the present invention is maintenance and inspection of a hull of a vessel since a portion of said hull is submerged underwater. The plurality of drive wheel assemblies 5 is peripherally and externally mounted to the vehicle body 1. The number within the plurality of drive wheel assemblies 5 is subject to change, but the preferred number is two. Referring to FIG. 4, FIG. 5, and FIG. 6, each of the plurality of drive wheel assemblies 5 comprises a tubular housing 6, a tubular drive shaft 7, a wheel 8, an annular cavity 9, an internal shaft 10, a semi-annular magnet 11, and a cover disk 33. The tubular housing 6 is laterally connected to the vehicle body 1 and houses the tubular drive shaft 7. The tubular drive shaft 7 is concentrically and rotatably mounted within the tubular housing 6 in order to receive rotational motion from one of the plurality of gearmotors 19. The wheel 8 allows the present invention to easily move and translate.

The wheel 8 is concentrically and rotatably mounted about the tubular housing 6. The tubular drive shaft 7 and the wheel 8 are magnetically coupled to each other in order to transfer torque without the use of shaft seals or other similar means, as direct contact methods create weak/leak points. The internal shaft 10 supports the wheel 8 and supports the semi-annular magnet 11 within the wheel 8. In particular, the internal shaft 10 is positioned concentrically traversing from the tubular drive shaft 7 into the wheel 8. Additionally, the internal shaft 10 is mounted to the tubular housing 6 in order to create a watertight seal for components within the tubular housing 6 and the vehicle body 1. The annular cavity 9 concentrically and laterally traverses into the wheel 8, opposite the vehicle body 1. The annular cavity 9 receives the semi-annular magnet 11 and ensures that the wheel 8 is able rotate freely relative to the internal shaft 10 and the semi-annular magnet 11. As such, the semi-annular magnet 11 is positioned within the annular cavity 9 and is terminally connected to the internal shaft 10 as seen in FIG. 4. As such, the semi-annular magnet 11 is fixed is a specific orientation while the wheel 8 rotates, regardless of the orientation of the wheel 8 or the vehicle body 1. This ensures a maximum magnetic force is applied to the ferrous surface as the distance between the semi-annular magnet 11 and the ferrous surface is always the same.

Figure 3:
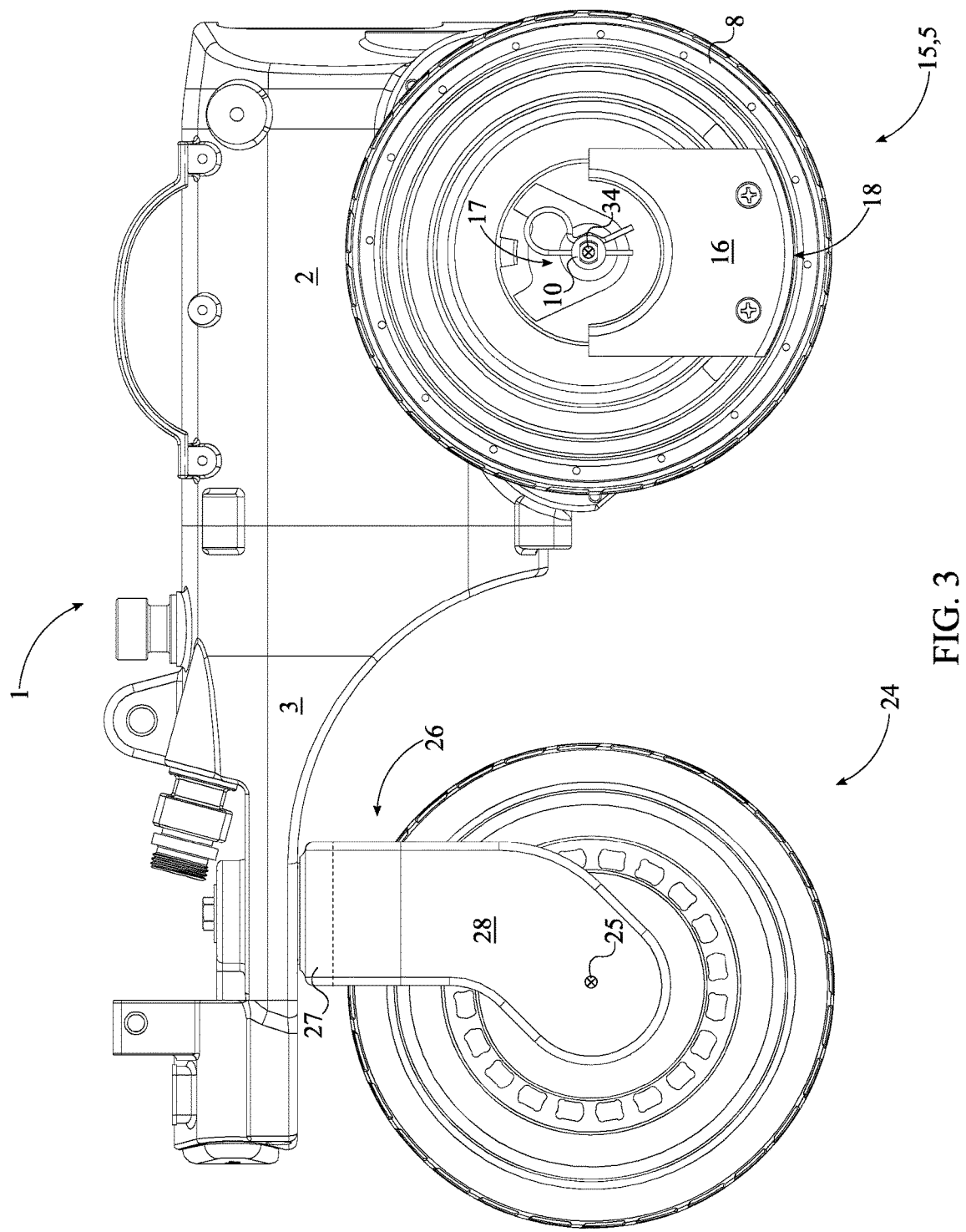
FIG. 3 is a side-view of the present invention.

Each of the plurality of drive wheel assemblies 5 further comprises a mounting arm 16. Referring to FIG. 3 and FIG. 4, the semi-annular magnet 11 is mounted to terminally connected to the internal shaft 10 by the mounting arm 16. The mounting arm 16 is positioned within the wheel 8 and is oriented perpendicular to a rotation axis 34 of the wheel 8. A proximal end 17 of the mounting arm 16 is terminally connected to the internal shaft 10. Additionally, the mounting arm 16 is oriented parallel to a sagittal plane 4 of the vehicle body 1; wherein the sagittal plane 4 bilaterally cuts through the vehicle body 1. In order to position the semi-annular magnet 11 close to the external surface of the wheel 8, a distal end 18 of the mounting arm 16 is orientated away from the vehicle body 1. In particular, the semi-annular magnet 11 is laterally connected to the distal end 18 of the mounting arm 16.

The semi-annular magnet 11 and the associated components within the wheel 8 are enclosed and protected from external factors by the cover disk 33. The cover disk 33 is shaped and sized to the wheel 8 in order to enclose the annular cavity 9. As such, the cover disk 33 is positioned concentric and adjacent to the wheel 8, opposite the vehicle body 1. Additionally, the cover disk 33 is perimetrically connected to the wheel 8.

Referring to FIG. 6, in the preferred embodiment of the present invention, each of the plurality of drive wheel assemblies 5 further comprises a plurality of first magnets 12 and a plurality of second magnets 13. The plurality of first magnets 12 and the plurality of second magnets 13 magnetically couple the tubular drive shaft 7 to the wheel 8 and allow for torque to be transferred without a physical/mechanical connection. It is preferred that each of the plurality of first magnets 12 and each of the plurality of second magnets 13 is bar shaped. The plurality of first magnets 12 acts as the internal coupling half and is radially mounted about the tubular drive shaft 7. Similar to traditional magnetic coupling systems, the plurality of first magnets 12 is arranged in an alternating poles configuration. The plurality of second magnets 13 acts as the external coupling half and is radially distributed about the plurality of first magnets 12 with each of the plurality of second magnets 13 being mounted within the wheel 8. The plurality of second magnets 13 is arranged in an alternating poles configuration. Furthermore, the plurality of second magnets 13 is positioned such that each of the plurality of first magnets 12 is positioned adjacent to a specific magnet from the plurality of second magnet which is of the opposite polarity. This ensures maximum efficiency in torque transfer.

In order to rotate the wheel 8 of each of the plurality of drive wheel assemblies 5, each of the plurality of gearmotors 19 is torsionally coupled to the tubular shaft of a corresponding wheel assembly from the plurality of drive wheel assemblies 5. In the preferred embodiment, the present invention utilizes a reverse tricycle configuration. In particular, the plurality of drive wheel assemblies 5 comprises a first wheel assembly 14 and a second wheel assembly 15; complimentary, the plurality of gearmotors 19 comprises a first gearmotor 20 and a second gearmotor 22. Additionally, in this embodiment, the present invention further comprises a caster wheel 24. The first wheel assembly 14 and the second wheel assembly 15 power and steer the vehicle body 1 while the caster wheel 24 provides a third point of contact for the vehicle body 1 for support purposes. Referring to FIG. 1, the first wheel assembly 14 and the second wheel assembly 15 are positioned concentric and opposite to each other, across the vehicle body 1. Additionally, the first wheel assembly 14 and the second wheel assembly 15 are positioned adjacent to the front portion 2. Complimentary, the first gearmotor 20 and the second gearmotor 22 are mounted within the vehicle body 1. The first wheel assembly 14 and the second wheel assembly 15 are each connected to a dedicated gearmotor from the plurality of gearmotors 19 in order to steer the vehicle body 1. More specifically the first gearmotor 20 is torsionally coupled to the tubular drive shaft 7 of the first wheel assembly 14. Similarly, the second gearmotor 22 is torsionally coupled to the tubular drive shaft 7 of the second wheel assembly 15. The torsional coupling may be achieved through a multitude of different means, the preferred method is through a gear system.

The caster wheel 24 adheres a portion of the vehicle body 1 to the ferrous surface, supports the vehicle body 1, and keeps the vehicle body 1 from rotating about the pitch axis. The caster wheel 24 is attached to the vehicle body 1 through an L-shaped mount 26. The L-shaped mount 26 is positioned adjacent to the rear portion 3. A first leg 27 of the L-shaped mount 26 is pivotably connected to the vehicle body 1 in order to allow the caster wheel 24 to act as a trailing wheel to the first wheel assembly 14 and the second wheel assembly 15. A second leg 28 of the L-shaped mount 26 is orientated parallel to the sagittal plane 4. The caster wheel 24 is laterally and rotatably mounted to the second leg 28 of the L-shaped mount 26, wherein a rotation axis 25 of the caster wheel 24 is positioned coplanar with the rotation axis 34 of the wheel 8 from the first wheel assembly 14.

In the preferred embodiment of the present invention, the caster wheel 24 is very similar to each of the plurality of drive wheel assemblies 5. In particular, the caster wheel 24 comprises a fixed shaft, a wheel housing, and a secondary semi-annular magnet 11. The fixed shaft is laterally and perpendicularly connected to the second leg of the U-shaped mount. The secondary semi-annular magnet 11 provides additional attraction force for the present invention to the external ferrous surface and is terminally connected to the fixed shaft, opposite the second leg of the U-shaped mount. The wheel housing is rotatably mounted about the fixed shaft and the secondary semi-annular magnet 11.

Figure 2:
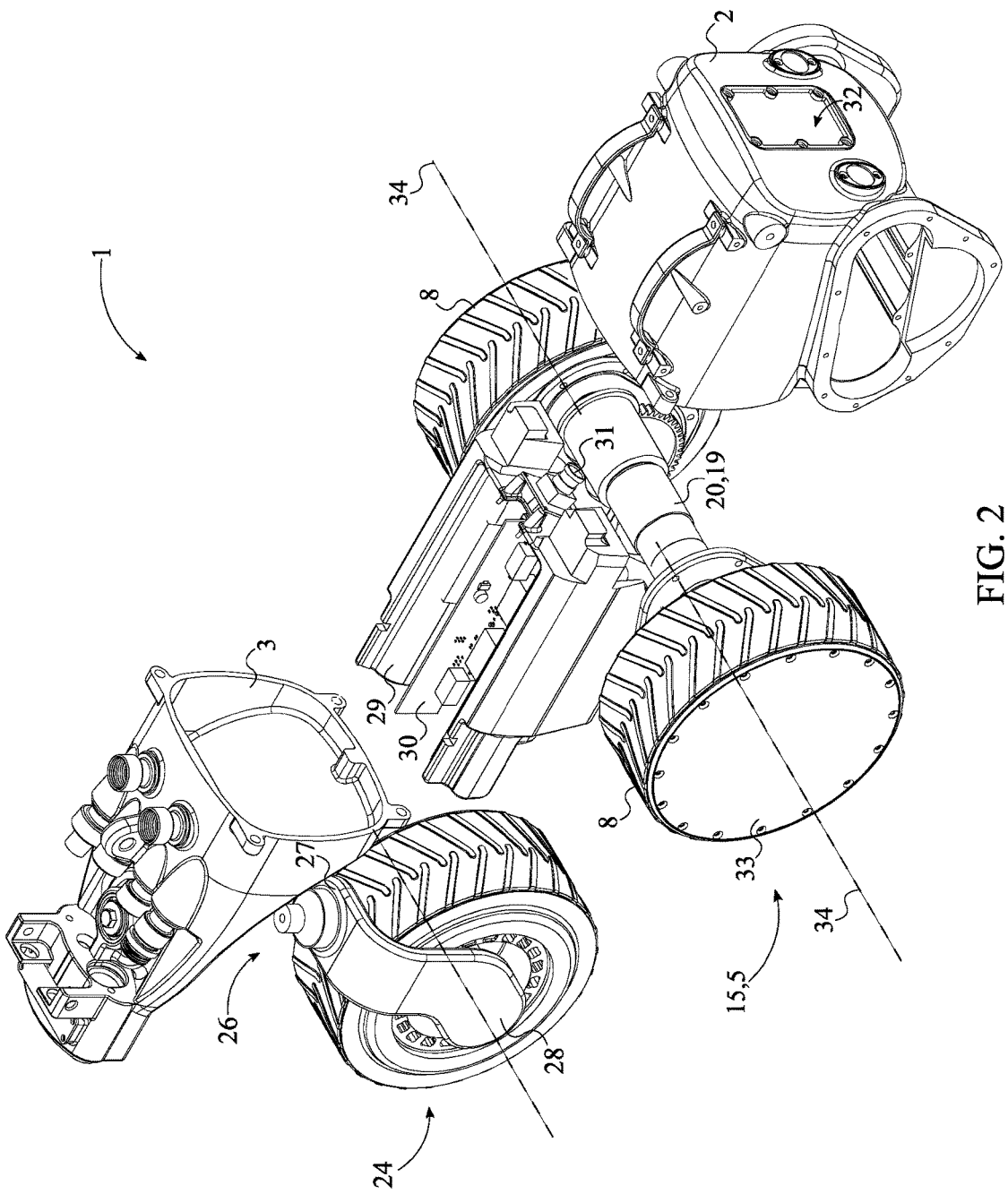
FIG. 2 is a partially exploded view of the present invention, depicting the components within the vehicle body.

Referring to FIG. 2, the present invention further comprises a rechargeable battery 29, a microcontroller 30, a camera 31, and a viewing window 32. The rechargeable battery 29 provides the electrical energy for the functions of the present invention. In particular, the rechargeable battery 29 is electrically connected to the camera 31, the microcontroller 30, and each of the plurality of gearmotors 19. The microcontroller 30 controls the electronic components of the present invention based on preset programming and user input; type of user input includes, but is not limited to, physical buttons and command signals received from a remote-control device. Thus, the microcontroller 30 is electronically connected to each of the plurality of gearmotors 19 and the camera 31. To protect against water damage, the rechargeable battery 29 and the microcontroller 30 are each mounted within the vehicle body 1. The camera 31 is a device used to record visual images. The camera 31 and the viewing window 32 allow the user of the present invention to visually inspect various areas of the structure in question. The viewing window 32 prevents water from entering the interior of the vehicle body 1 while simultaneously allowing the camera 31 to capture images. The viewing window 32 is mechanically integrated into the front portion 2, preferably in between the first wheel assembly 14 and the second wheel assembly 15. The camera 31 is mounted within the vehicle body 1, adjacent to the front portion 2, and is oriented towards the viewing window 32. Additional components that may be utilized with the present invention include, but are not limited to, a wireless communication device, an infrared sensor, a gyroscope sensor, and other similar devices.

Referring to FIG. 1, the present invention further comprises a plurality of ports. The plurality of ports allows external electrical cables to be connected to the present invention. The plurality of ports is positioned adjacent to the rear portion 3 and each of the plurality of ports is integrated into a top surface of the vehicle body 1. The plurality of ports may be used for mounting a tether, connecting a battery charger, connecting an external power source, the mounting of additional sensors, and auxiliary cameras.

The preferred embodiment discloses the present invention implemented as an inspection robotic unit, this is not meant to limit the scope of the present invention. In alternative embodiments of the present invention, alternative devices may be mounted onto or into the vehicle body 1 in order to achieve different purposes. For example, in one embodiment, a cleaning hose may be attached to the exterior of the vehicle body 1, thus allowing for spot cleaning through the present invention.

Although the invention has been explained in relation to its preferred embodiment, it is to be understood that many other possible modifications and variations can be made without departing from the spirit and scope of the invention as hereinafter claimed.

What is claimed is:

1. A magnetic robot crawler comprises:
    a vehicle body;
    a plurality of drive wheel assemblies;
    a plurality of gearmotors;
    each of the plurality of drive wheel assemblies comprise a tubular housing, a tubular drive shaft, a wheel, an annular cavity, an internal shaft, and a semi-annular magnet;
    the plurality of drive wheel assemblies being peripherally and externally mounted to the vehicle body;
    the plurality of gearmotors being mounted within the vehicle body;
    the tubular housing being laterally connected to the vehicle body;
    the tubular drive shaft being concentrically and rotatably mounted within the tubular housing;
    the wheel being concentrically and rotatably mounted about the tubular housing;
    the wheel and tubular drive shaft being magnetically coupled to each other;
    the internal shaft concentrically traversing from the tubular drive shaft into the wheel;
    the internal shaft being mounted to the tubular housing;
    the annular cavity concentrically and laterally traversing into the wheel, opposite the vehicle body;
    the semi-annular magnet being positioned within the annular cavity;
    the semi-annular magnet being terminally mounted to the internal shaft; and
    each of the plurality of gearmotors being torsionally coupled to the tubular drive shaft of a corresponding wheel assembly from the plurality of drive wheel assemblies.

2. The magnetic robot crawler as claimed in claim 1 comprises:
    each of the plurality of drive wheel assemblies further comprises a plurality of first magnets and a plurality of second magnets;
    the plurality of first magnets being radially mounted about the tubular drive shaft;
    the plurality of second magnets being radially distributed about the plurality of first magnets;
    each of the plurality of second magnets being mounted within the wheel; and
    the wheel and tubular drive shaft being magnetically coupled to each other through the plurality of first magnets and the plurality of second magnets.

3. The magnetic robot crawler as claimed in claim 1 comprises:
    the plurality of drive wheel assemblies comprises a first wheel assembly and a second wheel assembly;
    the plurality of gearmotors comprises a first gearmotor and a second gearmotor;
    the first wheel assembly and the second wheel assembly being positioned concentric and opposite to each other, across the vehicle body;
    the first gearmotor and the second gearmotor being mounted within the vehicle body;
    the first gearmotor being torsionally coupled to the tubular drive shaft of the first wheel assembly; and
    the second gearmotor being torsionally coupled to the tubular drive shaft of the second wheel assembly.

4. The magnetic robot crawler as claimed in claim 1 comprises:
    each of the plurality of drive wheel assemblies further comprising a mounting arm and a cover disk;
    the mounting arm being positioned within the wheel;
    the mounting arm being oriented perpendicular to a rotation axis of the wheel;
    the mounting arm being oriented parallel to a sagittal plane of the vehicle body;
    a proximal end of the mounting arm being terminally connected to the internal shaft;
    a distal end of the mounting arm being orientated away from the vehicle body;
    the semi-annular magnet being laterally connected to the distal end of the mounting arm;
    the cover disk being positioned concentric and adjacent to the wheel, opposite vehicle body; and
    the cover disk being perimetrically connected to the wheel.

5. The magnetic robot crawler as claimed in claim 3 comprises:
    a caster wheel;
    an L-shaped mount;
    the vehicle body comprises a front portion and a rear portion;
    the first wheel assembly and the second wheel assembly are positioned adjacent to the front portion;
    the L-shaped mount being positioned adjacent to the rear portion;
    a first leg of the L-shaped mount being rotatably connected to the vehicle body;
    a second leg of the L-shaped mount being oriented parallel to a sagittal plane of the vehicle body;
    the caster wheel being laterally and rotatably mounted to the second leg of the L-shaped mount; and
    a rotation axis of the caster wheel being positioned coplanar with a rotation axis of the wheel from the first wheel assembly.

6. The magnetic robot crawler as claimed in claim 1 comprises:
a rechargeable battery;
a microcontroller;
the rechargeable battery and the microcontroller being mounted within the vehicle body;
the rechargeable battery being electrically connected to the microcontroller and each of the plurality of gearmotors; and
the microcontroller being electronically connected to each of the plurality of gearmotors.

7. The magnetic robot crawler as claimed in claim 6 comprises:
a camera;
a viewing window;
the vehicle body comprises a front portion and a rear portion;
the viewing window being mechanically integrated into the front portion;
the camera being mounted within the vehicle body, adjacent to the front portion;
the camera being oriented towards the viewing window;
the rechargeable battery being electrically connected to the camera; and
the microcontroller being electronically connected to the camera.

8. A magnetic robot crawler comprises:
a vehicle body;
a plurality of drive wheel assemblies;
a plurality of gearmotors;
each of the plurality of drive wheel assemblies comprise a tubular housing, a tubular drive shaft, a wheel, an annular cavity, an internal shaft, and a semi-annular magnet;
the plurality of drive wheel assemblies being peripherally and externally mounted to the vehicle body;
the plurality of gearmotors being mounted within the vehicle body;
the tubular housing being laterally connected to the vehicle body;
the tubular drive shaft being concentrically and rotatably mounted within the tubular housing;
the wheel being concentrically and rotatably mounted about the tubular housing;
the wheel and tubular drive shaft being magnetically coupled to each other;
the internal shaft concentrically traversing from the tubular drive shaft into the wheel;
the internal shaft being mounted to the tubular housing;
the annular cavity concentrically and laterally traversing into the wheel, opposite the vehicle body;
the semi-annular magnet being positioned within the annular cavity;
the semi-annular magnet being terminally mounted to the internal shaft;
each of the plurality of gearmotors being torsionally coupled to the tubular drive shaft of a corresponding wheel assembly from the plurality of drive wheel assemblies;
each of the plurality of drive wheel assemblies further comprises a plurality of first magnets and a plurality of second magnets;
the plurality of first magnets being radially mounted about the tubular drive shaft;
the plurality of second magnets being radially distributed about the plurality of first magnets;
each of the plurality of second magnets being mounted within the wheel; and
the wheel and tubular drive shaft being magnetically coupled to each other through the plurality of first magnets and the plurality of second magnets.

9. The magnetic robot crawler as claimed in claim 8 comprises:
the plurality of drive wheel assemblies comprises a first wheel assembly and a second wheel assembly;
the plurality of gearmotors comprises a first gearmotor and a second gearmotor;
the first wheel assembly and the second wheel assembly being positioned concentric and opposite to each other, across the vehicle body;
the first gearmotor and the second gearmotor being mounted within the vehicle body;
the first gearmotor being torsionally coupled to the tubular drive shaft of the first wheel assembly; and
the second gearmotor being torsionally coupled to the tubular drive shaft of the second wheel assembly.

10. The magnetic robot crawler as claimed in claim 8 comprises:
each of the plurality of drive wheel assemblies further comprising a mounting arm and a cover disk;
the mounting arm being positioned within the wheel;
the mounting arm being oriented perpendicular to a rotation axis of the wheel;
the mounting arm being oriented parallel to a sagittal plane of the vehicle body;
a proximal end of the mounting arm being terminally connected to the internal shaft;
a distal end of the mounting arm being orientated away from the vehicle body;
the semi-annular magnet being laterally connected to the distal end of the mounting arm;
the cover disk being positioned concentric and adjacent to the wheel, opposite vehicle body; and
the cover disk being perimetrically connected to the wheel.

11. The magnetic robot crawler as claimed in claim 9 comprises:
a caster wheel;
an L-shaped mount;
the vehicle body comprises a front portion and a rear portion;
the first wheel assembly and the second wheel assembly are positioned adjacent to the front portion;
the L-shaped mount being positioned adjacent to the rear portion;
a first leg of the L-shaped mount being rotatably connected to the vehicle body;
a second leg of the L-shaped mount being oriented parallel to a sagittal plane of the vehicle body;
the caster wheel being laterally and rotatably mounted to the second leg of the L-shaped mount; and
a rotation axis of the caster wheel being positioned coplanar with a rotation axis of the wheel from the first wheel assembly.

12. The magnetic robot crawler as claimed in claim 8 comprises:
a rechargeable battery;
a microcontroller;
the rechargeable battery and the microcontroller being mounted within the vehicle body;
the rechargeable battery being electrically connected to the microcontroller and each of the plurality of gearmotors; and the microcontroller being electronically connected to each of the plurality of gearmotors.

13. The magnetic robot crawler as claimed in claim 12 comprises:
a camera;
a viewing window;
the vehicle body comprises a front portion and a rear portion;
the viewing window being mechanically integrated into the front portion;
the camera being mounted within the vehicle body, adjacent to the front portion;
the camera being oriented towards the viewing window;
the rechargeable battery being electrically connected to the camera; and
the microcontroller being electronically connected to the camera.

* * * * *